(12) United States Patent
Wu (10) Patent No.: US 11,165,981 B2
(45) Date of Patent: Nov. 2, 2021

(54) SYSTEM AND METHOD FOR CORRELATED DOUBLE SAMPLING

(71) Applicant: IMEC vzw, Leuven (BE)

(72) Inventor: Linkun Wu, Leuven (BE)

(73) Assignee: IMEC vzw, Leuven (BE)

(*) Notice: Subject to any disclaimer, the term of this patent is extended or adjusted under 35 U.S.C. 154(b) by 27 days.

(21) Appl. No.: 16/918,970

(22) Filed: Jul. 1, 2020

(65) Prior Publication Data
US 2021/0006739 A1   Jan. 7, 2021

(30) Foreign Application Priority Data
Jul. 2, 2019  (EP) .................................... 19183766

(51) Int. Cl.
*H04N 5/378*      (2011.01)
*H04N 5/363*      (2011.01)

(52) U.S. Cl.
CPC ............. *H04N 5/378* (2013.01); *H04N 5/363* (2013.01)

(58) Field of Classification Search
CPC .............................. H04N 5/378; H04N 5/363
See application file for complete search history.

(56) References Cited

U.S. PATENT DOCUMENTS

| 7,167,119 B1* | 1/2007 | Lei ..................... H03M 3/342 341/143 |
| 7,277,129 B1 | 10/2007 | Lee |
| 7,321,111 B2 | 1/2008 | Bamji |
| 2008/0079833 A1 | 4/2008 | Ichikawa |
| 2011/0058153 A1 | 3/2011 | Van Nieuwenhove |
| 2014/0240692 A1 | 8/2014 | Tien |
| 2017/0374307 A1 | 12/2017 | Kim |

OTHER PUBLICATIONS

Extended European Search Report dated Dec. 20, 2019 EP in counterpart Application No. EP 19183766.5.

* cited by examiner

*Primary Examiner* — Thanh Luu
(74) *Attorney, Agent, or Firm* — Knobbe, Martens, Olson & Bear, LLP (57) ABSTRACT

A circuit for correlated double sampling is disclosed. In one aspect, the circuit comprises a reset switch connected with an input node, and with a first node of a first capacitor; a sampling switch connected with the input node, and with a first node of a second capacitor; a second node of the first/second capacitor is adapted to be connected with a first/second reference node, of which at least one using a reference switch; a first switch connected between the second node of the first capacitor and the first node of the second capacitor; a second switch connected between the first node of the first capacitor and the second node of the second capacitor.

19 Claims, 4 Drawing Sheets

SYSTEM AND METHOD FOR CORRELATED DOUBLE SAMPLING

CROSS-REFERENCE TO RELATED APPLICATIONS

This application claims foreign priority to EP 19183766.5 filed Jul. 2, 2019 and titled "CORRELATED DOUBLE SAMPLING CIRCUIT AND METHOD", the content of which is incorporated by reference herein in its entirety.

BACKGROUND OF THE INVENTION

Technological Field

The disclosed technology relates to the field of correlated double sampling. More specifically it relates to a circuit and method for correlated double sampling.

Description of the Related Technology

For sensors/sensing devices, correlated double sampling (CDS) is an important technique to remove undesired offset and noise from the sensed signal. Especially the kTC reset noise can be reduced using CDS. CDS is typically used when the target signal is presented or converted into voltage information. In such devices, the sampling kTC noise typically decreases the signal to noise ratio.

AC-coupled CDS may also be used to remove reset noise of sensors/sensing devices. However, the capacitive voltage divider of such prior art systems limits the noise performance as well as the speed (see e.g. U.S. Pat. No. 7,612,817 B2), since a large CDS capacitor is required, which is difficult to drive, and of which the noise performance is not optimal.

The CDS can be considered as a subtraction operation. However, current CDS methods, especially the OPAMP based subtraction methods, are vulnerable in the power, area and noise.

There is therefore a need for alternative CDS circuits and methods.

SUMMARY OF CERTAIN INVENTIVE ASPECTS

In a first aspect, disclosed embodiments relate to a sampling circuit for correlated double sampling. The sampling circuit comprises:
  an input node,
  a reset switch electrically connected with its first node to the input node, and electrically connected with its second node to a first node of a first capacitor,
  a sampling switch electrically connected with its first node to the input node, and electrically connected with its second node to a first node of a second capacitor,
  a first reference node, a second reference node, wherein a second node of the first capacitor is adapted to be electrically connected with, or is electrically connected with, the first reference node, and a second node of the second capacitor is adapted to be electrically connected with, or is electrically connected with, the second reference node, and wherein at least one of the second nodes of the first or second capacitor can be electrically connected with the corresponding reference node using a reference switch,
  a first switch electrically connected between the second node of the first capacitor and the first node of the second capacitor,
  a second switch electrically connected between the first node of the first capacitor the second node of the second capacitor.

It is an advantage of some embodiments of the disclosed technology that a reset voltage, present on the input node, can be sampled on the first capacitor and that a signal voltage, present on the input node, can be sampled on the second capacitor. Using a sampling circuit according embodiments of the disclosed technology it is possible to subtract the charge on the first capacitor with the charge on the second capacitor, or vice versa. Hence, a charge which was common on both the first and the second capacitor will be partly or completely cancelled after the subtraction. This common charge may for example be due to reset noise or due to kTC noise. It is an advantage of embodiments of the disclosed technology that these noise components are removed from the eventual signal.

In embodiments of the disclosed technology, the first reference node may be connected to a first reference voltage, the second reference node to a second reference voltage. The first reference voltage and the second reference voltage may be the same. The first reference voltage and the second reference voltage may be the electrical ground. In embodiments of the disclosed technology, the first reference node and the second reference node may be the same node.

It is an advantage of embodiments of the disclosed technology that level shifting can be implemented by controlling the voltages of the first reference node and the second reference node. The level shifting can for example be important in sensor designs, as devices may require a different voltage range compared to their low voltage readout circuitry.

In embodiments of the disclosed technology, the first capacitor and the second capacitor may have the same capacitance value.

In embodiments of the disclosed technology, the first capacitor may be tunable and/or the second capacitor may be tunable.

It is an advantage of embodiments of the disclosed technology that the capacitance values of the first and second capacitor can be changed. The first capacitor and/or the second capacitor may for example be programmable capacitor banks. By turning on/off some capacitors, the capacitance of the first and the second capacitor can be tuned.

In embodiments of the disclosed technology, the first capacitor may be a voltage controlled capacitor and/or the second capacitor may be a voltage controlled capacitor.

It is an advantage of embodiments of the disclosed technology that the voltage on the first reference node and the voltage on the second reference node can be used for tuning the capacitance values of the first and second capacitor.

In embodiments of the disclosed technology, the first capacitor and/or wherein the second capacitor may be a MOSFET.

It is an advantage of embodiments of the disclosed technology that the MOSFET can be biased to have a stable capacitance value by tuning the threshold voltage, and/or the first reference voltage and/or the second reference voltage.

It is an advantage of embodiments of the disclosed technology that the non-linearity of the capacitance value of a MOSFET can be used to realize a gain. In general, any tunable capacitor can be used to realize a gain by decreasing the capacitance value after sampling the first and second voltage, and before measuring the voltage at the second node of the capacitor which is electrically connected with the reference switch. This functionality may be implemented in a controller.

A sampling circuit according to embodiments of the disclosed technology may comprise a controller adapted for:
sampling a first voltage from the input node on the first capacitor by opening the reset switch,
and for sampling a second voltage from the input node on the second capacitor by opening the sampling switch,
and for opening the reference switch after sampling the first and the second voltage, and for closing the first switch and the second switch after opening the reference switch.

It is an advantage of embodiments of the disclosed technology that common noise which causes a charge on the first capacitor and the second capacitor will be reduced because of the subtraction when closing the first switch and the second switch.

In embodiments of the disclosed technology, the sampling circuit is adapted for decreasing the capacitance values of the first and second capacitor after opening the reference switch.

It is an advantage of embodiments of the disclosed technology that a voltage gain of the voltage on the floating node can be realized.

In a second aspect, embodiments of the disclosed technology relate to a pixel comprising a sampling circuit according to embodiments of the disclosed technology and comprising a sensor which comprises an integrating sensing element of which a sensor output pin is directly or indirectly connected with the input node and which comprises a reset element for resetting the integrating sensing element.

The reset element may for example be a sampling switch. A buffer may be present between the sensor output pin and the input node.

In embodiments of the disclosed technology, the controller is adapted for:
resetting the sensing element using the reset element, and for sampling the first voltage after resetting the sensing element,
and for sampling the second voltage after integration of an incoming signal on the sensing element.

It is an advantage of embodiments of the disclosed technology that the first voltage corresponds with the reset voltage, and that the second voltage corresponds with an integrated voltage of the integrating sensing element.

In embodiments of the disclosed technology, the integrating sensing element may be a photodiode or a pinned photodiode.

In a third aspect, embodiments of the disclosed technology relate to a pixel array comprising a plurality of pixels according to embodiments of the disclosed technology wherein the pixels are arranged in an array.

In a pixel array according to embodiments of the disclosed technology, the controller may be shared between the pixels.

In a fourth aspect, embodiments of the disclosed technology relate to a method for correlated double sampling a signal from an integrating sensing element. The method comprises:
resetting the sensing element,
sampling a first voltage on a first capacitor, wherein the first voltage is obtained from an output of the sensing element connected with a first node of the first capacitor, and wherein a second node of the first capacitor is connected with a first reference voltage,
sampling a second voltage on a second capacitor, wherein the second voltage is obtained from the output of the sensing element, after integrating an incoming signal on the sensing element, and wherein a second node of the second capacitor is connected with a second reference voltage,
disconnecting the second node of the first or the second capacitor from the first respectively second reference voltage thus obtaining a floating node, and cross-connecting the first capacitor and the second capacitor wherein nodes with opposite polarities are connected,
measuring a voltage on the floating node.

In embodiments of the disclosed technology, the first reference voltage and the second reference voltage may be the same. In embodiments of the disclosed technology the first reference voltage and the second reference voltage may be electrical ground.

A method according to embodiments of the disclosed technology may comprise decreasing the capacitance values of the capacitors after sampling the first and the second voltage and before measuring the voltage on the floating node.

It is an advantage of embodiments of the disclosed technology that a voltage gain of the voltage on the floating node can be realized.

Particular and preferred aspects of the disclosed technology are set out in the accompanying independent and dependent claims. Features from the dependent claims may be combined with features of the independent claims and with features of other dependent claims as appropriate and not merely as explicitly set out in the claims.

These and other aspects of the disclosed technology will be apparent from and elucidated with reference to the embodiment(s) described hereinafter.

Any reference signs in the claims shall not be construed as limiting the scope.

In the different drawings, the same reference signs refer to the same or analogous elements.

DETAILED DESCRIPTION OF THE CERTAIN ILLUSTRATIVE EMBODIMENTS

The disclosed technology will be described with respect to particular embodiments and with reference to certain drawings but the disclosed technology is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the disclosed technology.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the disclosed technology described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the disclosed technology, the only relevant components of the device are A and B.

Reference throughout this specification to "one embodiment" or "an embodiment" means that a particular feature, structure or characteristic described in connection with the embodiment is included in at least one embodiment of the disclosed technology. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the disclosed technology, various features of the disclosed technology are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the disclosed technology requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this disclosed technology.

Furthermore, while some embodiments described herein include some but not other features included in other embodiments, combinations of features of different embodiments are meant to be within the scope of the disclosed technology, and form different embodiments, as would be understood by those in the art. For example, in the following claims, any of the claimed embodiments can be used in any combination.

In the description provided herein, numerous specific details are set forth. However, it is understood that embodiments of the disclosed technology may be practiced without these specific details. In other instances, well-known methods, structures and techniques have not been shown in detail in order not to obscure an understanding of this description.

In a first aspect, embodiments of the disclosed technology relate to a sampling circuit 100 for correlated double sampling.

The sampling circuit 100 comprises an input node 110A, a reset switch 120 which is electrically connected with its first node 120A to the input node 110A, and which is electrically connected with its second node 120B to a first node 130A of a first capacitor 130. Where in embodiments of the disclosed technology reference is made to "electrically connected" reference is made to a connection by means of a conductive path. In embodiments of the disclosed technology, an electrical connection may be achieved through a closed switch.

The sampling circuit 100, moreover, comprises a sampling switch 140 electrically connected with its first node 140A to the input node 110A, and electrically connected with its second node 140B to a first node 150A of a second capacitor 150.

The sampling circuit 100, moreover, comprises a first reference node 110B and a second reference node 110C. A second node 130B of the first capacitor 130 is adapted to be electrically connected with, or is electrically connected with, the first reference node 110B, and a second node 150B of the second capacitor 150 is adapted to be electrically connected with, or is electrically connected with, the second reference node 110C. Moreover, at least one of the second nodes 130B, 150B of the first or second capacitor 130, 150 can be electrically connected with the corresponding reference node (the first capacitor with the first reference node and/or the second capacitor with the second reference node) using a reference switch 160. In embodiments of the disclosed technology, at least one of the second nodes 130B, 150B of the first or second capacitor 130, 150 can be electrically disconnected from the corresponding reference node using the reference switch.

The sampling circuit 100, moreover, comprises a first switch 171 electrically connected with its first node 171A to the second node 130B of the first capacitor 130 and with its second node 171B to the first node 150A of the second capacitor 150.

The sampling circuit 100, moreover, comprises a second switch 172 electrically connected with its first node 172A to the first node 130A of the first capacitor 130 and with its second node 172B to the second node 150B of the second capacitor 150.

Sampling circuits in accordance with embodiments of the disclosed technology are applicable to sample the voltage of integrating sensing elements. They are for example applicable for sensors/sensing devices which require CDS for the sampling kTC noise. Sampling circuits in accordance with embodiments of the disclosed technology, moreover, may bring features such as level shifting and amplification. Sampling circuits in accordance with embodiments of the disclosed technology may for example be conceived in the context of image sensors. The disclosed technology is, however, not limited thereto. Sampling circuits according to embodiments of the disclosed technology may also be used for sampling other sensing elements where voltage sampling is required. The combination of a sampling circuit and a sensing element is a second aspect of the disclosed technology and is further below referred to as a pixel.

A pixel 300 in accordance with embodiments of the disclosed technology comprises a sampling circuit 100 according to embodiments of the disclosed technology and comprises a sensor 200. The sensor 200 comprises an integrating sensing element 210 of which a sensor output pin 210A is directly or indirectly connected with the input node 110A and comprises a reset element 220 for resetting the integrating sensing element 210.

As discussed above the integrating sensing element may be any integrating sensor where voltage sampling is required. The integrating sensor may for example be an optical sensor.

Sampling circuits 100 in accordance with embodiments of the disclosed technology are schematically illustrated in FIG. 1 to FIG. 4. The principle of operating a sampling circuit 100 in accordance with embodiments of the disclosed technology is based on charge conservation and will be explained with the schematics of FIG. 1 to FIG. 4.

As a typical voltage sampling example, a typical 3 transistor structure such as used in imagers is shown. The sensor 200, in accordance with embodiments of the disclosed technology, comprises an integrating sensing element 210 (e.g. a photodiode), a sampling switch 220 and a buffer 230. The sensing element 210 may be extended to a 4T structure (pinned-photodiode) with an additional transfer gate. To measure the exact voltage, a sampling operation is required, which can generate large kTC noise at the sensor output pin 210A. Introducing the buffer 230 will result in a higher sensitivity.

Figure 1:
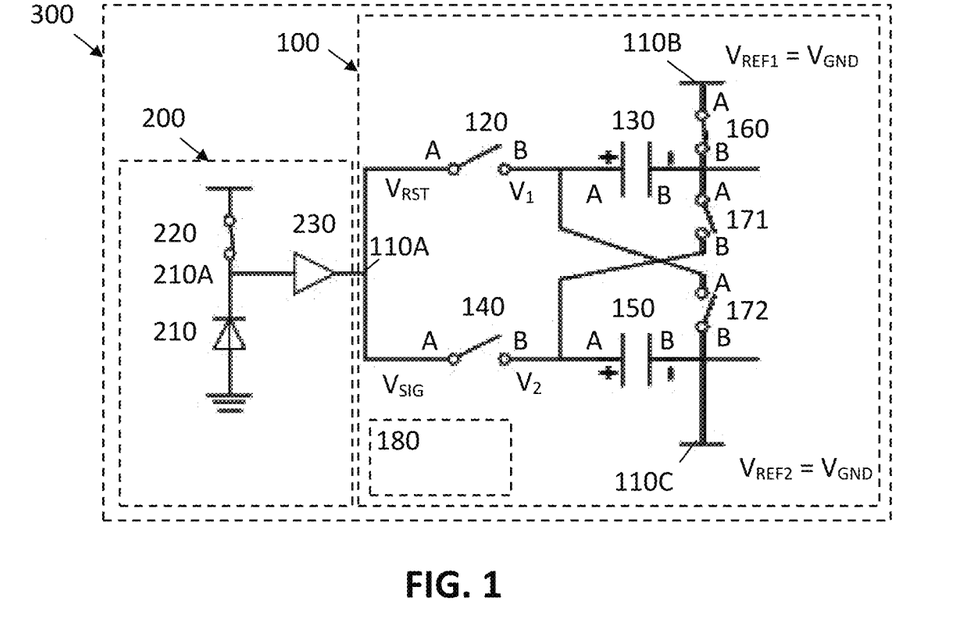
FIG. 1 shows a schematic drawing of a sampling circuit for CDS in accordance with embodiments of the disclosed technology.

FIG. 1 also shows a sampling circuit 100 in accordance with embodiments of the disclosed technology. The sampling circuit 100 is adapted for correlated double sampling of a voltage from an integrating sensing element. In the exemplary embodiment illustrated in FIG. 1 the sampling circuit is present after the buffer 230. The sampling circuit 100 comprises two sampling capacitors 130, 150 and minimum 3 switches 171, 172, 160 to realize the CDS operation in the charge domain. In some embodiments of the disclosed technology, two reference switches may be present. One between the first reference node 110B and the second node 130B of the first capacitor, and one between the second reference node 110C and the second node 150B of the second capacitor 150. The first capacitor 130 and the second capacitor 150 may for example be implemented as passive capacitors, such as for example Metal-Insulator-Metal (MIM) capacitors. The disclosed technology is, however, not limited thereto and many other materials may be used. In some embodiments of the disclosed technology, the first capacitor 130 and the second capacitor 150 may be implemented as Metal-Oxide-Semiconductor Field-Effect Transistor (MOSFET) capacitors or as standalone capacitors.

A way of operating a sampling circuit 100, in accordance with embodiments of the disclosed technology, is explained in the paragraphs below. First the sensing element is reset by closing the reset switch 220. At a time $t_1$, the reset switch 120 is switched OFF (i.e. it is opened), and a first voltage is sampled on the first capacitor 130 (of which the second node 130B is connected with a first reference voltage $V_{REF1}$ which, in this example, is equal to $V_{GND}$). This may for example be a reset voltage $V_{RST}$. The reset voltage may for example be the sum of $V_{RST,DC}+V_{RST,n}$, wherein the $V_{RST,DC}$ corresponds with the reset DC voltage and $V_{RST,n}$ corresponds with the reset noise. This may for example comprise or mainly consist of the kTC noise.

At a time $t_2$, the sampling switch 140 is switched OFF for sampling a second voltage on the second capacitor 150 (of which the second node 150B is connected with a second reference voltage $V_{REF2}$ which, in this example, is equal to $V_{GND}$). The second voltage is obtained after integrating an incoming signal on the sensing element 210. The second voltage is also referred to as the sensing voltage $V_{SIG}$. This may be the sum of $V_{RST,DC}+V_{RST,n}+V_A$. In this example $V_A$ is the wanted sensing signal.

Hence, in the example of FIG. 1, the first capacitor has a charge of $V_{RST} \cdot C_1$ (wherein $C_1$ is the capacitance of the first capacitor 130) and the capacitor has a charge of $V_{SIG} \cdot C_2$ (wherein $C_2$ is the capacitance of the second capacitor 150).

At a time $t_3$, the reference switch 160 is turned OFF, leaving the second node of the first capacitor floating and hence, leaving the charge on the first capacitor 130 floating. Later, the subtraction is done by turning the first switch 171 and the second switch 172 ON (i.e. by closing them). By charge conservation, due to the flipped polarity of the first capacitor 130, a new combined voltage $V_2$ can be defined as:

$$V_2 \cdot (C_1+C_2) = V_{SIG} \cdot C_2 - V_{RST} \cdot C_1$$

If $C_1=C_2$, then $V_2=(V_{SIG}-V_{RST})/2=V_A/2$. Thus, a clean $V_A$ without the reset offset and reset noise is obtained and can be used in the following blocks. $V_2$ is the voltage on the first node 150A of the second capacitor 150. This is the voltage on the floating node.

In embodiments of the disclosed technology, the sampling circuit 100 may comprise a controller 180 adapted for controlling some or all of the following switches: the reset switch 120, the sampling switch 140, the reference switch 160, the first switch 171, the second switch 172, and/or the reset element 120. The controller may be part of the sampling circuit 100. Alternatively the controller may be external. Controlling of the switches may be done according to the switching scheme explained in the previous paragraphs or according to a switching scheme explained in one of the following paragraphs.

Compared to the conventional CDS scheme, only three switches are added as overhead. Thus, a sampling circuit 100 in accordance with embodiments of the disclosed technology may be superior in power consumption, and/or in area and/or in noise.

Figure 2:
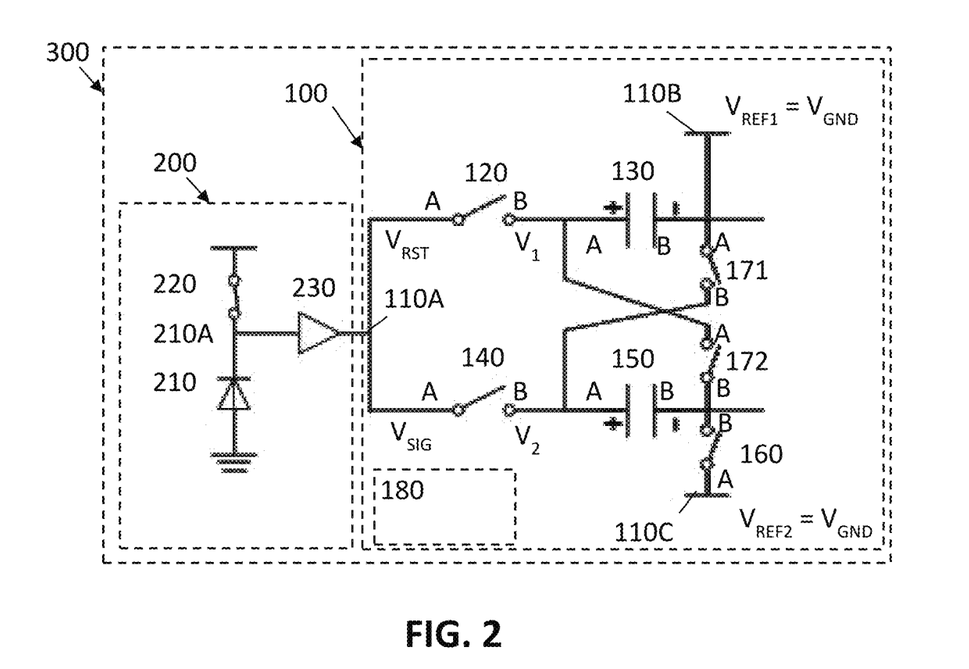
FIG. 2 shows a schematic drawing of a sampling circuit for CDS with inversion in accordance with embodiments of the disclosed technology.

In the exemplary embodiment illustrated in FIG. 1, a reference switch 160 is connecting the second node 130B of the first capacitor 120 with the first reference node 110B. In another configuration a reference switch 160 may be connecting the second node 150B of the second capacitor 150 with the second reference node 110C. An example thereof is illustrated in FIG. 2. In yet another example reference switches may be present for both capacitors.

In the example of FIG. 2 a similar switching scheme as for FIG. 1 may be applied. At the time $t_3$, the switch reference switch 160 is switched OFF, leaving the second node 150B of the second capacitor 150 floating and hence, leaving the charge on the second capacitor 150 floating. Later, the subtraction is done by turning the first switch 171 and the second switch 172 ON. Instead of subtracting the charge on the first capacitor 130, here the charge on the second capacitor 150 is subtracted. In this case, the voltage $V_1$ on the first node 130A of the first capacitor 130 is the output to be read out and used (this corresponds with the voltage of the floating node). Thus, correlated double sampling with inversion is achieved. In this configuration, the inversion can be achieved as $$V_1 \cdot (C_1+C_2) = V_{RST} \cdot C_1 - V_{SIG} \cdot C_2$$

When $C_1=C_2$, then $V_1=(V_{RST}-V_{SIG})/2=-V_A/2$. Since the output of the sensor is typically monotonically increasing or decreasing from its reset DC voltage, the inversion version allows a different signal range, bringing in a new freedom in choosing the following implementation at no cost.

Figure 3:
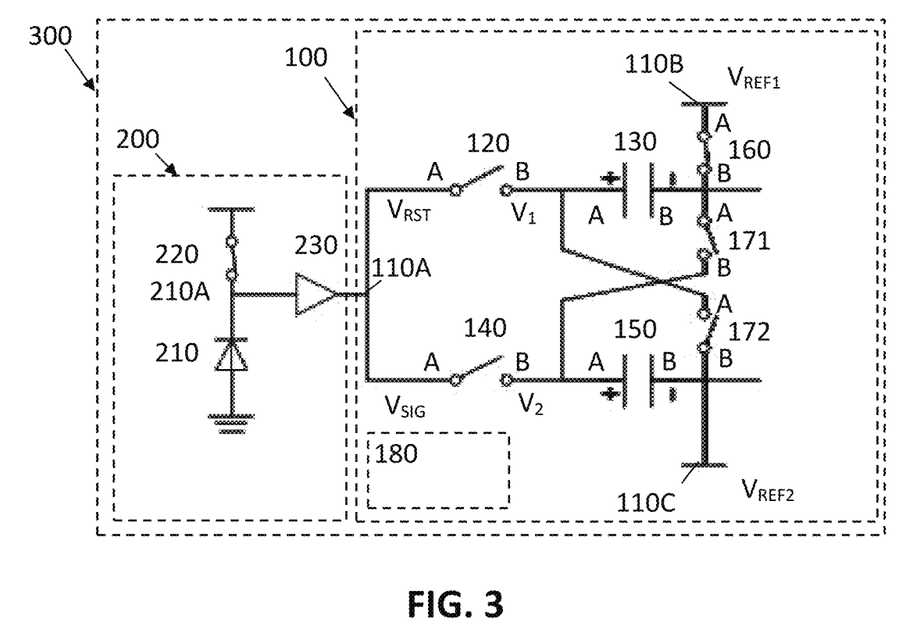
FIG. 3 shows a schematic drawing of a sampling circuit for CDS with level shifting in accordance with embodiments of the disclosed technology.

In embodiments of the disclosed technology, level shifting may be implemented by controlling the voltages of the first reference node and the second reference node. An example thereof is illustrated in FIG. 3. In this example the reset voltage $V_{RST}$ and the signal voltage $V_{SIG}$ are sampled against a reference voltage $V_{REF1}$ on the first reference node 110B and a reference voltage $V_{REF2}$ on the second reference node 110C, which leads to:

$$V_2 \cdot (C_1+C_2) = (V_{SIG}-V_{REF2}) \cdot C_2 - (V_{RST}-V_{REF1}) \cdot C_1$$

When $C_1=C_2$, then $V_2=(V_{SIG}-V_{RST}-V_{REF2}+V_{REF1})/2 = V_A/2 + (V_{REF1}-V_{REF2})/2$. Therefore, by adjusting the $V_{REF1}$ and $V_{REF2}$, the output $V_2$ can be DC shifted.

Figure 4:
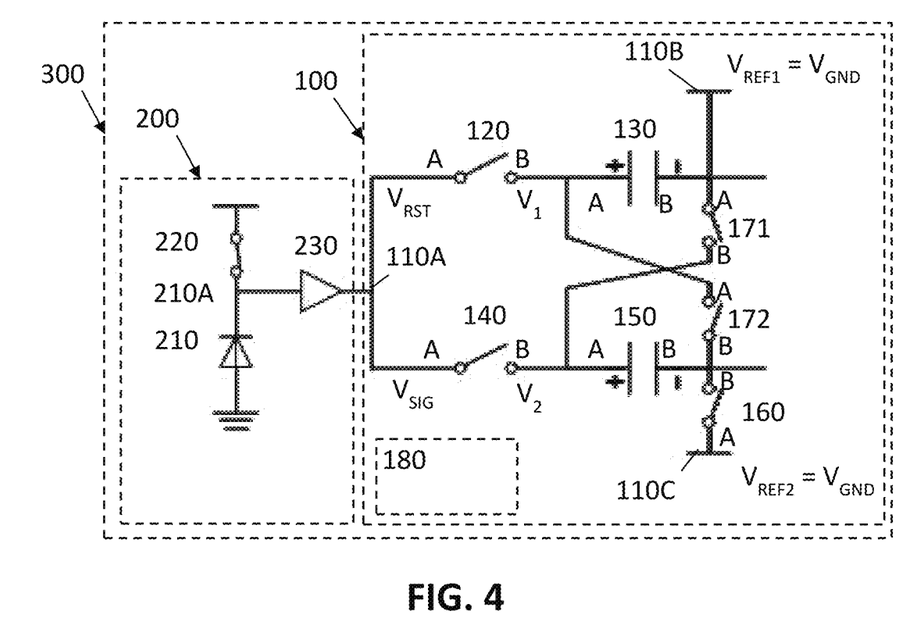
FIG. 4 shows a schematic drawing of a sampling circuit for CDS with inversion and level shifting in accordance with embodiments of the disclosed technology.

In another exemplary embodiment of the disclosed technology, as shown in FIG. 4, the voltage of $V_1$ can be obtained as:

$$V_1 \cdot (C_1+C_2) = (V_{RST}-V_{REF1}) \cdot C_1 - (V_{SIG}-V_{REF2}) \cdot C_2$$

When $C_1=C_2$, then $V_1=(V_{RST}-V_{SIG}-V_{REF1}+V_{REF2})/2 = -V_A/2 + (V_{REF2}-V_{REF1})/2$. Therefore, by adjusting the $V_{REF1}$ and $V_{REF2}$, the output $V_1$ can be DC shifted with the inversion.

It is an advantage of embodiments of the disclosed technology that the first reference voltage $V_{REF1}$ and the second reference voltage $V_{REF2}$, can be selected to optimize the implementation of the first capacitor 130 and the second capacitor 150. For example, if a MOSFET transistor is used as capacitor, its capacitance can be varied against the gate-source voltage. By choosing a proper first reference voltage $V_{REF1}$ and a second reference voltage $V_{REF2}$, a more stable capacitance can be achieved with a certain signal swing.

Since the accuracy of the charge domain calculation will be affected by a mismatch between the capacitance values of the first capacitor and the second capacitor, it is advantageous that in some embodiments of the disclosed technology the capacitances of the first and/or second capacitor are tuneable. In embodiments of the disclosed technology, the first and/or second capacitor 120, 140 may for example be implemented as a programmable capacitor bank. By turning on/off some capacitors, the value of $C_1$ and $C_2$ can be calibrated.

In another exemplary embodiment of the disclosed technology the capacitors may be implemented as a MOSFET or another voltage-controlled capacitor. In that case the capacitance values may be tuned by controlling the first reference voltage $V_{REF1}$ and the second reference voltage $V_{REF2}$. The MOSFET can be biased to have a stable capacitance by e.g. tuning the threshold voltage Vt, the first reference voltage $V_{REF1}$ and the second reference voltage $V_{REF2}$, or by introducing depletion mode transistors.

In embodiments of the disclosed technology, the sampling circuit 100 may be adapted for decreasing the capacitance values of the capacitors 130, 150, after sampling the first and the second voltage and before measuring the voltage on the floating node. Thus a voltage gain of the voltage on the floating node can be realized.

In embodiments of the disclosed technology, MOSFETs may for example be used to implement the first and second capacitor. In that case it may for example be that the MOSFET cannot be biased well enough to ensure a stable capacitance. In these embodiments, it may be advantageous that an additional amplification can be introduced for better noise performance.

Figure 5:
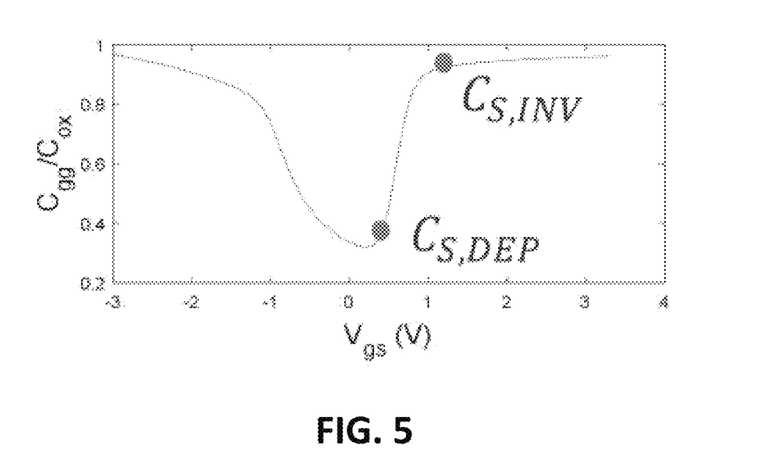
FIG. 5 shows the capacitance in function of the voltage of a MOSFET.

A MOSFET typically has a high sheet capacitance, which is typically not very linear (see FIG. 5). However, in embodiments of the disclosed technology, it is possible to take advantage of this non-linearity of the capacitance versus voltage to realize a gain. Due to the CDS, by setting the right voltages, the first and/or the second transistor can be forced moving from the inversion into depletion region. This leads to a lower capacitance ($C_{S,DEP}$ instead of $C_{S,INV}$), thus creating a voltage gain, since the charge on the sampling capacitor after the CDS is reserved constant. One must, however, take into account that linearity may degrade in this case.

The kTC noise from the sampling of $V_{RST}$ and $V_{SIG}$ (which is an inherit problem for all CDS techniques), may be reduced by increasing the capacitance value of the first and second capacitor. Sampling circuits according to embodiments of the disclosed technology may result in a decreased signal gain. The effective gain of the CDS operation of a sampling circuit in accordance with embodiments of the disclosed technology is 0.5. This may have a noise impact on the following blocks. This can for example be recovered by MOSFET amplification at the cost of linearity.

Figure 6:
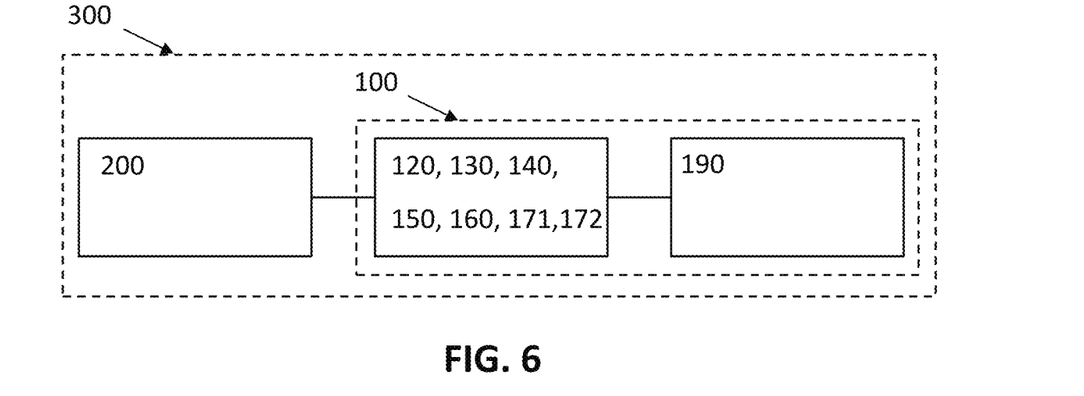
FIG. 6 shows a schematic diagram of a sampling circuit comprising a voltage buffer in accordance with embodiments of the disclosed technology.

A sampling circuit 100 according to an exemplary embodiment of the disclosed technology may additionally comprise a memory bank 190 or a voltage buffer 190 following $V_1$ or $V_2$ for voltage sensing. An example thereof is schematically shown in FIG. 6. The sampling circuit 100 in FIG. 6 may for example be a sampling circuit with CDS and inversion, and optional amplification, in accordance with embodiments of the disclosed technology. It is adapted for sampling the sensor output voltage of a sensor 200.

Figure 8:
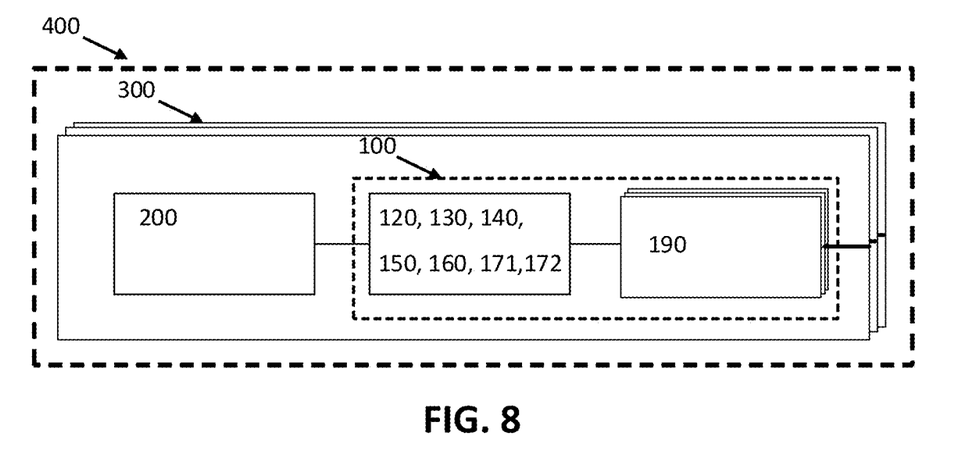
FIG. 8 shows a schematic diagram of a pixel array in accordance with embodiments of the disclosed technology.

In a third aspect, embodiments of the disclosed technology relate to a pixel array 400 comprising a plurality of pixels 300 in accordance with embodiments of the disclosed technology. An example thereof is illustrated in FIG. 8. It shows a pixel array 400 comprising a plurality of pixels 300 in accordance with embodiments of the disclosed technology. Also in this example the sampling circuit 100 may additionally comprise a memory bank 190 or a voltage buffer 190.

Sampling circuits 100 according to embodiments of the disclosed technology may be used in image sensors to implement column level CDS or even pixel CDS. It is, moreover, advantageous that along with the CDS, level shifting can be easily realized at the same time.

In a fourth aspect, embodiments of the disclosed technology relate to a method 500 for correlated double sampling a signal from an integrating sensing element. The method comprises:
  resetting 510 the sensing element,
  sampling a first voltage 520 on a first capacitor 130, wherein the first voltage is obtained from an output of the sensing element connected with a first node 130A of the first capacitor, and wherein a second node 130B of the first capacitor is connected with a first reference voltage 110B,
  sampling a second voltage 530 on a second capacitor 150, wherein the second voltage is obtained from the output of the sensing element, after integrating an incoming signal on the sensing element, and wherein a second node 150B of the second capacitor 150 is connected with a second reference voltage 110C,
  disconnecting 540 the second node of the first or the second capacitor from the first respectively second reference voltage thus obtaining a floating node, and cross-connecting 550 the first capacitor 130 and the second capacitor 150 wherein nodes with opposite polarities are connected,
  measuring 560 a voltage on the floating node.

Sampling circuits according to embodiments of the disclosed technology may comprise a controller adapted for controlling the switches in accordance with the method described above.

Figure 7:
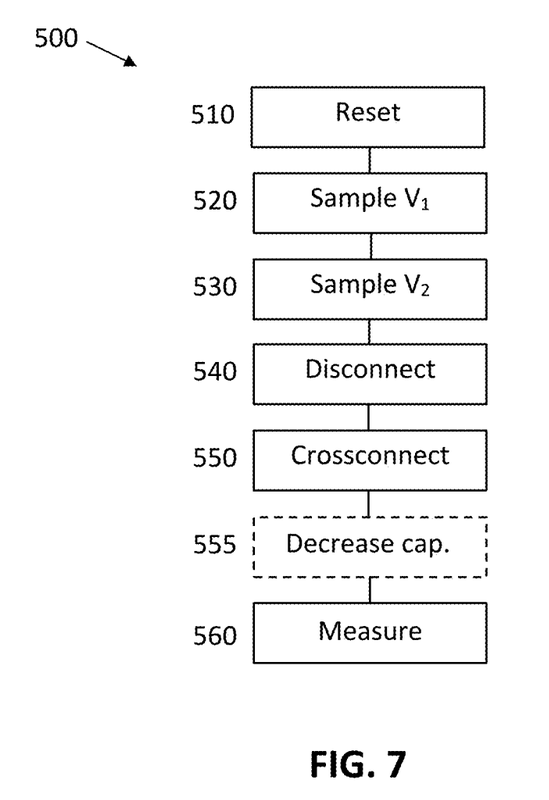
FIG. 7 shows a flow chart of a method in accordance with embodiments of the disclosed technology.

A flow chart of an exemplary method in accordance with embodiments of the disclosed technology is shown in FIG. 7. The first reference voltage and the second reference voltage may be tunable. They may be different from zero. Thus level shifting may be applied. In embodiments of the disclosed technology, the first reference voltage and the second reference voltage may be electrical ground. A method in accordance with embodiments of the disclosed technology optionally may comprise decreasing 555 the capacitance values of the capacitors after sampling the first and the second voltage and before measuring the voltage on the floating node.

In summary, because of the CDS with only a limited number of switches it is an advantage of embodiments of the disclosed technology that a low noise, low power, low area, and easily controllable sampling circuit is obtained. This is particularly the case because the subtraction is done with a few switches and capacitors without using amplifiers.

Moreover, in particular embodiments of the disclosed technology, flexible, precise level shifting is enabled. By adjusting the reference voltages, the sensor output can be level shifted to almost any arbitrary voltage.

What is claimed is:

1. A sampling circuit for correlated double sampling, the sampling circuit comprising:
   an input node;
   a reset switch electrically connected by a first reset switch node to the input node and electrically connected by a second reset switch node to a first node of a first capacitor;
   a sampling switch electrically connected by a first sampling switch node to the input node and electrically connected by a second sampling switch node to a first node of a second capacitor;
   a first reference node and a second reference node, wherein:
      a second node of the first capacitor is electrically connected with the first reference node,
      a second node of the second capacitor is electrically connected with the second reference node, and
      at least one of the second nodes of the first or second capacitor can be electrically connected with the corresponding reference node by a reference switch;
   a first switch electrically connected by a first node of the first switch to the second node of the first capacitor and by a second node of the first switch to the first node of the second capacitor; and
   a second switch electrically connected by a first node of the second switch to the first node of the first capacitor and by a second node of the second switch to the second node of the second capacitor.

2. The sampling circuit according to claim 1, wherein the first capacitor and the second capacitor have the same capacitance value.

3. The sampling circuit according to claim 1, wherein at least one of the first capacitor and the second capacitor is tunable.

4. The sampling circuit according to claim 1, wherein at least one of the first capacitor and the second capacitor is a voltage controlled capacitor.

5. The sampling circuit according to claim 1, wherein at least one of the first capacitor or the second capacitor is a MOSFET.

6. The sampling circuit according to claim 1, further comprising a controller configured to:
   sample a first voltage from the input node on the first capacitor by opening the reset switch,
   sample a second voltage from the input node on the second capacitor by opening the sampling switch,
   open the reference switch after sampling the first voltage and the second voltage, and
   close the first switch and the second switch after opening the reference switch.

7. The sampling circuit according to claim 6, wherein the controller is further configured to decrease capacitance values of the first capacitor and the second capacitor after opening the reference switch.

8. A pixel comprising:
   the sampling circuit of claim 1; and
   a sensor comprising:
      an integrating sensing element having a sensor output pin directly or indirectly connected with the input node, and
      a reset element for resetting the integrating sensing element.

9. The pixel according to claim 8, further comprising a controller configured to:
   sample a first voltage from the input node on the first capacitor by opening the reset switch,
   sample a second voltage from the input node on the second capacitor by opening the sampling switch,
   reset the sensing element using the reset element,
   sample the first voltage after resetting the sensing element, and
   sample the second voltage after integration of an incoming signal on the sensing element.

10. The pixel according to claim 8, wherein the integrating sensing element is a photodiode or a pinned photodiode.

11. A pixel array comprising a plurality of pixels according to claim 8, wherein the pixels are arranged in an array.

12. A pixel array comprising a plurality of pixels according to claim 9, wherein the controller is shared between the pixels.

13. A method of correlated double sampling a signal from an integrating sensing element, the method comprising:
   resetting the sensing element;
   sampling a first voltage on a first capacitor, wherein the first voltage is obtained from an output of the sensing element connected with a first node of the first capacitor and a second node of the first capacitor is connected with a first reference voltage;
   sampling a second voltage on a second capacitor, wherein the second voltage is obtained from the output of the sensing element, after integrating an incoming signal on the sensing element, and a second node of the second capacitor is connected with a second reference voltage;
   disconnecting the second node of the first capacitor or the second capacitor from the first reference voltage or the second reference voltage, respectively, thus obtaining a floating node, and cross-connecting the first capacitor and the second capacitor, wherein nodes with opposite polarities are connected; and
   measuring a voltage on the floating node.

14. The method according to claim 13, wherein the first reference voltage and the second reference voltage are the same or wherein the first reference voltage and the second reference voltage are electrical grounds.

15. The method according to claim 13, further comprising decreasing the capacitance values of the first capacitor and the second capacitor after sampling the first voltage and the second voltage and before measuring the voltage on the floating node.

16. A sampling system comprising:
an input node;
a reset switch electrically connected between the input node and a first node of a first capacitor;
a sampling switch electrically connected between the input node and a first node of a second capacitor;
a first switch electrically connected between a second node of the first capacitor and the first node of the second capacitor;
a second switch electrically connected between the first node of the first capacitor and a second node of the second capacitor; and
first and second reference nodes, wherein the second node of the first capacitor is electrically connected with the first reference node and the second node of the second capacitor is electrically connected with the second reference node.

17. The sampling system according to claim 16, wherein the first capacitor and the second capacitor are tunable to the same capacitance value.

18. The sampling system according to claim 17, further comprising a controller configured to:
sample a first voltage from the input node on the first capacitor by opening the reset switch,
sample a second voltage from the input node on the second capacitor by opening the sampling switch,
open the reference switch after sampling the first voltage and the second voltage, and
close the first switch and the second switch after opening the reference switch.

19. The sampling system according to claim 18, wherein the controller is further configured to decrease capacitance values of the first capacitor and the second capacitor after opening the reference switch.

* * * * *